United States Patent [19]

Scott et al.

[11] Patent Number: 4,556,979

[45] Date of Patent: Dec. 3, 1985

[54] PIEZOELECTRICALLY TUNED SHORT CAVITY DYE LASER

[75] Inventors: Gary W. Scott, Riverside; Aaron J. Cox, Redlands, both of Calif.

[73] Assignee: University of California, Berkeley, Calif.

[21] Appl. No.: 439,757

[22] Filed: Nov. 8, 1982

[51] Int. Cl.[4] ............................................. H01S 3/10
[52] U.S. Cl. ...................................... 372/20; 372/54; 372/19; 372/92
[58] Field of Search ........................ 372/53, 92, 20, 19

[56] References Cited

U.S. PATENT DOCUMENTS

| | | | |
|---|---|---|---|
| 4,081,765 | 3/1978 | Berg et al. | 372/20 |
| 4,150,342 | 4/1979 | Johnston, Jr. et al. | 372/20 |
| 4,187,475 | 2/1980 | Wieder | 372/54 |

OTHER PUBLICATIONS

Cox et al; "Single Mode, Piezoelectrically Tuned, Picosecond Short-Cavity Dye Laser"; *Appl. Phys. Lett.*, 40 (8), p. 664, Apr. 15, 1982.
Article entitled "Short-Cavity Picosecond Dye Laser Design" by A. J. Cox and Gary W. Scott, Applied Optics, vol. 18, p. 532, 2/15/79.
Reprint from the Proceedings of the Society of Photo-Optical Instrumentation Engineers entitled "A Tunable Dye Laser in the 400-500 nm Range for Picosecond Spectroscopy" by Gary W. Scott and A. J. Cox, vol. 113 (Aug., 1977).
Article entitled "Tunable Blue Picosecond Pulses from a Dye Laser" by A. J. Cox, Gary W. Scott, and Larry D. Talley, Applied Physics Letters, vol. 31, No. 6, Sep. 15, 1977.

*Primary Examiner*—William L. Sikes
*Assistant Examiner*—Léon Scott, Jr.
*Attorney, Agent, or Firm*—Poms, Smith, Lande & Rose

[57] ABSTRACT

A picosecond short cavity dye laser utilizes a piezoelectric translator to vary the length of the optical cavity in the laser to allow continuous tuning of the output wavelength. The laser includes a pair of closely spaced generally flat mirrors forming an optical cavity. A laser dye solution is inserted into the cavity. The short cavity laser is pumped by pulses from another laser to produce picosecond output pulses. The piezoelectric translator, which is attached to one of the mirrors, moves the mirror to tune the laser as an applied DC voltage is varied. The piezoelectric tuning of the dye laser allows the laser to operate in a tunable single axial mode.

8 Claims, 6 Drawing Figures

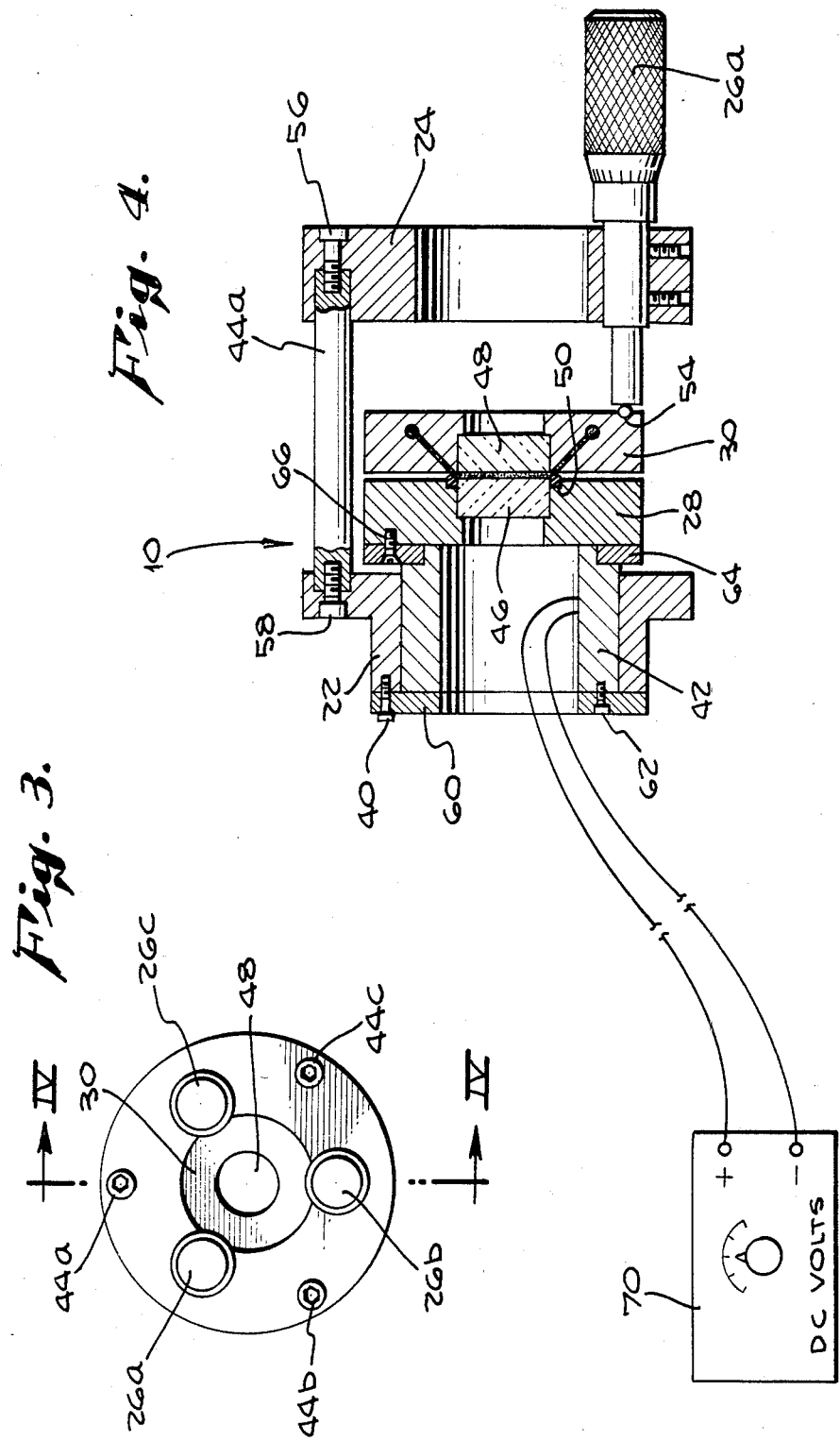

PIEZOELECTRICALLY TUNED SHORT CAVITY DYE LASER

FIELD OF THE INVENTION

This invention relates generally to short-cavity picosecond dye lasers and specifically to the tuning thereof.

BACKGROUND OF THE INVENTION

A laser usually consists of a volume filled with a light amplifying medium (gas, liquid, or solid) surrounded by a pair of parallel mirrors which cause the light to be repeatedly reflected through the amplifier. The two mirrors and the space between them are referred to as an optical cavity and the light trapped between them oscillates in the form of standing waves at frequencies, $f_N = Nc/2nd$ where c is the speed of light, n is the refractive index of the material between the mirrors, d is the distance between the mirrors and N is an integer.

Usually the amplifying medium is capable of amplifying a certain range of light frequencies called the "gain bandwidth", $\Delta F$, within which there may be several oscillating cavity frequencies, $f_N$. Each of these oscillating frequencies is called a laser mode, and when more than one of these modes is oscillating and being emitted by the laser it is said to be in "multi-mode oscillation".

Short cavity dye lasers (SCDL) are known in the art and have been described by us in several articles: "Tunable Blue Picosecond Pulses From A Dye Laser," Applied Physics Letters 31, 389-391 (1977); "A Tunable Dye Laser In The 400-500 nm Range for Picosecond Spectroscopy," *Proceedings of the Society of Photo-Optical Instrumentation Engineers* 113, 25-34 (1977); "Short-Cavity Picosecond Dye Laser Design, Applied Optics 18, 532-535 (1979). FIG. 2 of the last article, a cross-section of a prior art SCDL, is presented herein as FIG. 1 for purposes of describing the basic operation of a SCDL.

Briefly, as shown in FIG. 1, the short cavity dye laser comprises a pair of mirrors 146 and 148 separated by a fraction of a millimeter, with the space between completely filled with a liquid organic dye solution 168 which serves as the light amplifying medium. Since the frequency separation of adjacent cavity mode frequencies is $\Delta f = c/2nd$, a short cavity length, d, results in a large mode spacing $\Delta f$. When $\Delta f$ is greater than the gain bandwidth $\Delta F$, only a single cavity mode frequency is amplified and the laser is said to be in "single mode oscillation".

The laser is excited (pumped) by a short duration light pulse (6 to 300 ps) from another laser (e.g., Nd: glass, Nd: YAG, nitrogen) which is focused into the dye through one of the mirrors 146. The extremely short cavity length has a second benefit; it causes the dye laser to emit a light pulse which is of shorter duration than the pumping pulse. For example, when the SCDL is pumped with a 20 ps pulse, it emits a pulse of about 8 ps. Thus the laser is a picosecond ($10^{-12}$ seconds) short cavity dye laser.

When the cavity length is varied slightly, the output frequency of the SCDL is also varied. This variation of output frequency (i.e., variable color) is referred to as "tuning" the laser.

In FIG. 1, the cavity length is adjusted by three micrometers 126, only one of which 126a is shown. The micrometers 126 bear against ball bearings 154 mounted in a support ring 130 supporting the output mirror 148. The input mirror 146 is mounted to another support ring 128 rigidly attached to the SCDL frame 124 by three rods 144, only one of which 144a is shown. An O-ring 150 is mounted between the support rings and surrounds the edge of the mirrors. The micrometers 126 push the output mirror-ring assembly 148-130 against the input mirror-ring assembly 146-128. By adjusting the micrometers 126, the amount of O-ring compression and thus the optical cavity-dye cell length may be varied. The O-ring 150 serves to seal the sides of the dye cell and acts as a preloaded spring against which the micrometers press.

Accurate cavity adjustment is difficult to achieve and maintain with the manually adjusted prior art SCDLs. As a result, it has been difficult to accurately tune the SCDL and to maintain tuning once achieved. As an additional result, it has been difficult to produce a rugged and reliable SCDL. It has also been difficult to manually tune a SCDL in "single mode oscillation" (single frequency or color) with the mode of operation found in prior art SCDLs.

Accordingly, it is the principal object of the present invention to accurately tune a SCDL and to maintain such accurate tuning.

It is an additonal object of this invention to allow extremely short cavity lengths in a SCDL.

It is a further object of this invention to achieve single mode oscillation in a SCDL.

Yet another object of this invention is to ruggedize a SCDL.

A further object of this invention is to continuously tune a SCDL within the lasing bandwidth of a typical dye gain curve.

SUMMARY OF THE INVENTION

The present invention, in a broad aspect, provides a short cavity dye laser having an electrically tuned optical cavity. More specifically, the invention provides a piezoelectric-translator tuned picosecond short cavity dye laser (PZT-SCL). The PZT-SCL includes two flat mirrors held parallel. One of the mirrors is mounted on a hollow cylindrical piezoelectric translator which can vary the separation of the mirrors as a DC voltage is applied to the device. The volume between the mirrors is completely filled with an organic dye solution which serves as the amplifying medium for the laser. When a short duration (e.g., 20 picosecond) pulse from another laser (e.g., $Nd^{+3}$:YAG, $Nd^{+3}$: Glass, $N_2$-TEA lasers) is focused into the dye through one of the PZT-SCL mirrors, the PTZ-SCL is energized and emits its own laser pulse out through the other mirror.

This pulse has very important technical characteristics. First, it is shorter in duration than the original exiting pulse (e.g., for 20 ps excitation the PZT-SCL produces about an 8 ps pulse of its own). Second, the pulse is spectrally narrow (i.e., nearly monochromatic), as a typical wavelength spread would be less than 1 angstrom. This combination of pulse duration and spectral width is very nearly as good as is physically possible (as defined by the Fourier transform limit). Third, the narrow spectrum can be varied over a few hundred angstroms for a given dye by merely adjusting a DC bias voltage applied to the PZT. Fourth, the mirrors and dye can be easily changed and, with the appropriate excitation laser, the PZT-SCL can operate throughout the visible and into the near uv and I.R. regions of the spectrum. Fifth, the output wavelength of the PZT-SCL pulse can be frequency-stabilized over long periods of time by a feedback voltage to the PZT. Finally, the laser is quite small and rugged and can easily be integrated into the complex experimental arrangement common in modern laser spectroscopy.

Other objects, features and advantages will become apparent from a consideration of the following detailed description and accompanying drawings.

BRIEF DESCRIPTION OF THE DRAWINGS

FIG. 3 is an end view of the PZT-SCL of FIG. 2, taken through the plane III—III;

FIG. 4 is a cross sectional view of the PZT-SCL of FIG. 2, taken through the plane IV—IV of FIG. 3;

DETAILED DESCRIPTION

Figure 1:
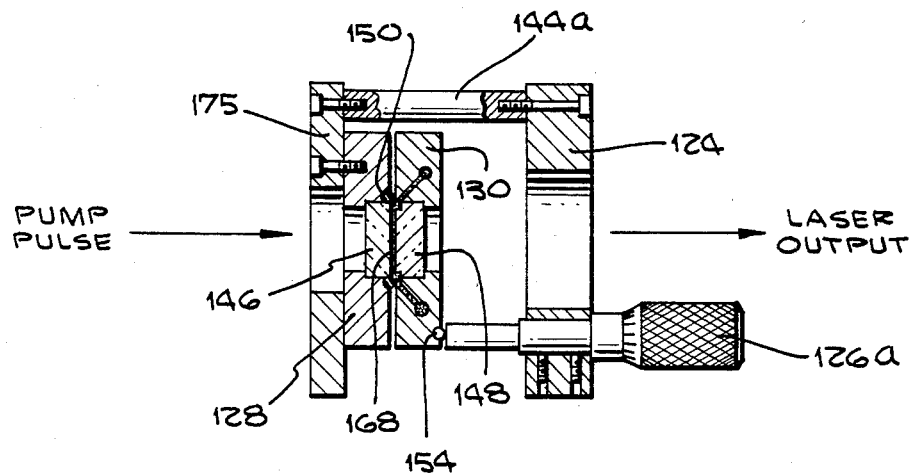
FIG. 1 is a partial cross sectional view of a prior art short cavity dye laser.

The prior art short cavity dye lasers, as reflected in FIG. 1, have provided optical cavity lengths in the range of approximately 10 to 50 $\mu$m. Extremely short cavity lengths have resulted in cavity photon lifetimes on the order of a picosecond and account for the short pulses that these lasers generate. When pumped by the second or third harmonic of a modelocked $Nd^{+3}$: glass laser, short cavity dye lasers have produced pulses as short as 2 ps in the red (second harmonic pump) and blue (third harmonic pump) region of the spectrum. Output pulse spectra typically have included from several to 20 axial modes, separated by the free spectral range of the dye laser, extending over the gain bandwidth of the dye.

The novel short cavity dye laser discussed hereinbelow incorporates a piezoelectric translator that can electrically control the cavity length, as well as a modified optical cavity, to permit operation at cavity lengths less than 10 $\mu$m. These two novel changes in short cavity dye laser design produce a laser output that can be limited to a single axial mode which can be electrically tuned continuously over the entire gain bandwidth of the dye. Electrically-tuned, multimode operation of this laser is also possible. This new laser can be pumped by subnanosecond pulses from a wide variety of lasers such as harmonics of the modelocked $Nd^{+3}$: glass laser, $Nd^{+3}$: YAG laser, $Ar^+$ ion laser, $N_2$ laser, and others.

Figure 2:
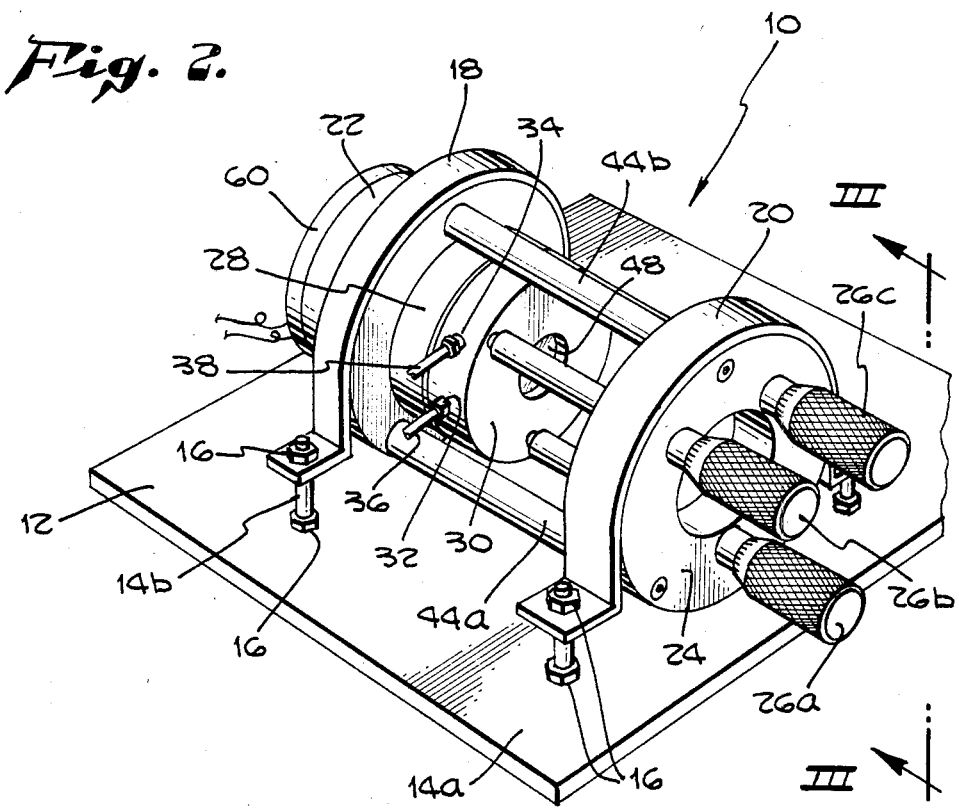
FIG. 2 is a perspective view of a piezoelectric-translator-tuned picosecond short cavity dye laser (PZT-SCL) according to the present invention.

Turning now to the drawings, FIG. 2 shows a perspective view of the piezoelectric translator tuned short cavity dye laser (PZT-SCL) 10 according to the present invention. The laser 10 includes a base 12 having a plurality of threaded vertical supports 14a, b, c, d, each having positioned thereon a plurality of nuts 16 to hold a pair of clamps 18 and 20 rigidly to the base 12. The first and second clamps 18 and 20 rigidly attach first and second rings 22 and 24, respectively, to the base 12. Between the two rings 22 and 24 are a plurality of support rods 44a, b, c which are attached to the rings 22 and 24 by a plurality of screws 58 and 56, respectively. All of these components form a rigid frame which support an optical cavity and the means for accurately adjusting that cavity.

Figure 5:
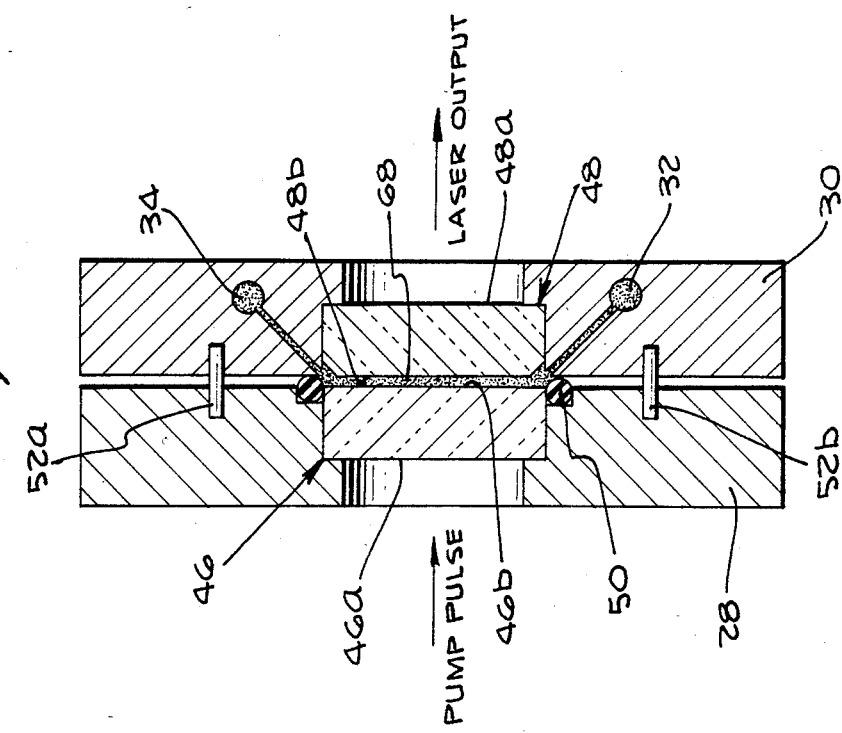
FIG. 5 is an enlarged view of the cavity portion of the PZT-SCL in FIG. 4.

The optical cavity is shown in more detail in FIGS. 4 and 5. The optical cavity is formed by two closely spaced mirrors 46 and 48 attached to a pair of mirror supports 28 and 30, respectively. As shown in FIG. 5, laser light from the pump laser is passed into the leftmost, or input, mirror 46, passes through a dye 68 between the two mirrors to produce laser light out of the rightmost or output mirror 38. The dye solution 68 is introduced into the optical cavity through a dye inlet 32 in the output mirror support 30 and exits the optical cavity from a dye outlet 34, also in the output mirror support 30. Dye inlet and outlet tubes 36 and 38, connected respectively to the dye inlet and output ports 32 and 34, allow dye to be continuously pumped through the optical cavity, as might be required for high repetition rate operation. The dye inlet port 32 is beneath the dye outlet port 34 to allow the dye to be introduced beneath the optical cavity and flow up through the cavity to eliminate bubbles in the dye.

Assembly and roughly parallel alignment of the input and output mirror mounting rings 28 and 30 is facilitated by a plurality of pins 52, two of which 52a and 52b are shown in FIG. 5.

Both the input and output mirrors 46 and 48 are thick fused quartz substrates. In a prototype of the invention, the substances were flat to $\lambda/20$ with nonreflective outer surfaces wedged by 30 minutes of arc and AR coated for the visible. The input mirror 46 had a first surface 46a with an antireflective coating, and a second surface 46b with a dichroic coating which transmitted greater than approximately 35% of the wavelength of the pump laser and reflected greater than 98% of the dye emission. The output mirror 48 has a first surface 48a coated to reflect greater than 90% of the spectral output of the laser, and a second surface 48b with the AR coating.

The prototype PZT-SCL was pumped by a single, second harmonic pulse from a modelocked $Nd^{+3}$: glass laser at 533 nm and it produced picosecond pulses in the range of 580 to 645 nm using red dyes. The dichroic input mirror 46 thus transmitted approximately 85% of the 533 nm pump and reflected greater than 98% of the red dye emission. The output mirror 48 reflected approximately 90% between 590 and 670 nm. The increase of the output mirror 48 reflectivity to 90% allowed lasing to be achieved at cavity lengths below 5 $\mu$m. The advantage of operating at such extremely short cavity lengths was that single axial mode operation was achieved. Prior art short cavity laser designs utilized output mirrors with reflectivities of 40% to 60%. With a 60% output mirror, a cavity length below 50 $\mu$m reduces lasing efficiency and lasing at cavity lengths less than 10 $\mu$m was marginal or impossible with the prior art lasers. It should be understood, however, that the reflectivities for the mirrors used in the prototype are not the only ones which will produce the desired result. Other reflectivities, within limits, will work equally well, if not better. For example, the novel PZT-SCL of the present invention may have a greater efficiency or narrower modewidth if a slightly higher (or lower) output mirror reflectivity is used. Furthermore, a PZT tuned SCL could be pumped through the same mirror through which the output pulse comes. Such a variation would not necessarily make the laser better, but it would be slightly different.

In accordance with the present invention, the position of the input mirror 46 is precisely adjusted by means of a piezoelectric translator 42. The piezoelectric translator 42 is electrically connected to a variable source of DC voltage 70 as known in the art. The piezoelectric translator is also of a type known in the art, and in a prototype of the present invention, was Model 2.838 made by Lansing Company. One end of the piezoelectric translator 42 is attached to a flange 64, which is in turn attached by screws 66 to the inlet mirror mounting ring 28. The piezoelectric translator 42 is cylindrical and hollow and is attached by screws 62 to a ring 60. Ring 60 is also attached to the first or inlet ring 22 by screws 40. The piezoelectric translator 42 is thus maintained in coaxial alignment with the input mirror 46. Adjusting the output voltage of the DC power suppy 70 causes the piezoelectric translator 42 to change in length in order to precisely move the input mirror 46 and thereby precisely adjust the length of the optical cavity formed between the mirrors. The hollow and cylindrical piezoelectric translator also allows completely free access to the input mirror for axial pumping. The output wavelength of the PZT-SCL pulse can also be frequency-stabilized over long periods of time by electrical feedback means as known in the art. Such feedback means would apply a feedback voltage to the PZT in response to unwanted changes in the spacing of the mirrors 46 and 48 to correct such changes. The feedback means would sense the spacing of the optical cavity mirrors 46, 48 either by mechanical means (e.g., a transducer) or optical means (i.e., monitoring the PZT-SCL output wavelength). The feedback means would be coupled to circuit means which would vary the voltage applied to the PZT 42 in response to the changes in the mirror spacing.

The o-ring 50, which corresponds the optical cavity and seals the dye within the cavity, acts as a preloaded spring holding the mirrors 46 and 48 apart. The force of the piezoelectric translator 42 is thus against the o-ring 50. Changing the length of the piezoelectric translator 42 changes the amount of compression of the o-ring and thus the length of the optical cavity is varied.

Three precision micrometers 26 are mounted in the second or output ring 24 and bear against the outlet mirror mount ring 30 by means of ball bearings 54. The micrometers generally have flat tips and the ball bearings 54 are embedded to approximately one-half their diameter in the outlet mirror mount 30. The micrometers 26 are used to bring the two mirrors 46 and 48 into parallel alignment during the assembly of the laser 10 and are also used to coarsely adjust the operating length of the cavity from approximately 200 μm to 5 μm, to an accuracy of plus or minus 2 μm. In this manner, the rough operating length and parallel alignment are first obtained by using the micrometers 26a, 26b and 26c acting on the output mirror 48. The input mirror 46 is then translated using the piezoelectric translator 42 to precisely adjust the cavity length. The piezoelectric translator 42 control of the cavity length thus allows for continuous electrical tuning of the axial cavity mode.

In experiments performed with a PZT-SCL according to the present invention, excellent results have been obtained. In these experiments, the pump laser was the $Nd^{+3}$: glass laser which was passively modelocked with Eastman 9860 saturable dye. A green pulse was focused into the optical cavity of the PZT-SCL axially through the dichroic input mirror 28, with the dye concentration being adjusted to yield an absorbance of greater than one at 533 nm for the chosen cavity length so that most of the pump beam was absorbed by the dye solution. The PZT-SCL was operated using rhodamine 6G in an ethanol: water solution, rhodamine B in ethanol, and rhodamine 640 in ethanol, all lasing in the red. These dyes yielded tuning ranges of 583–617 nm for rhodamine 6G, 590–630 nm for rhodamine B, and 605–645 nm for rhodamine 640.

The free spectral range of the PZT-SCL is given by the expression:

$$\Delta\lambda = (\lambda^2/2nd)$$

in which, λ is the average wavelength within Δλ, n is the index of refraction of the dye solution, and d is the cavity length. At a cavity length of 5 μm and an average wavelength of 600 nm, the free spectral range was 26 nm, which allowed no more than two axial modes to lase within the gain bandwidth, of these dyes. The spectrum of the PZT-SCL's output at 5 μm cavity length was just one or two axial modes, each with a spectral linewidth that ranged from approximately 15 angstroms in single mode to 3 angstroms in multimode. In other experiments with the PZT-SCL, single mode linewidths as narrow as 0.7 angstroms have been observed. Usually, only a single mode oscillated at cavity lengths below 5 μm.

Figure 6:
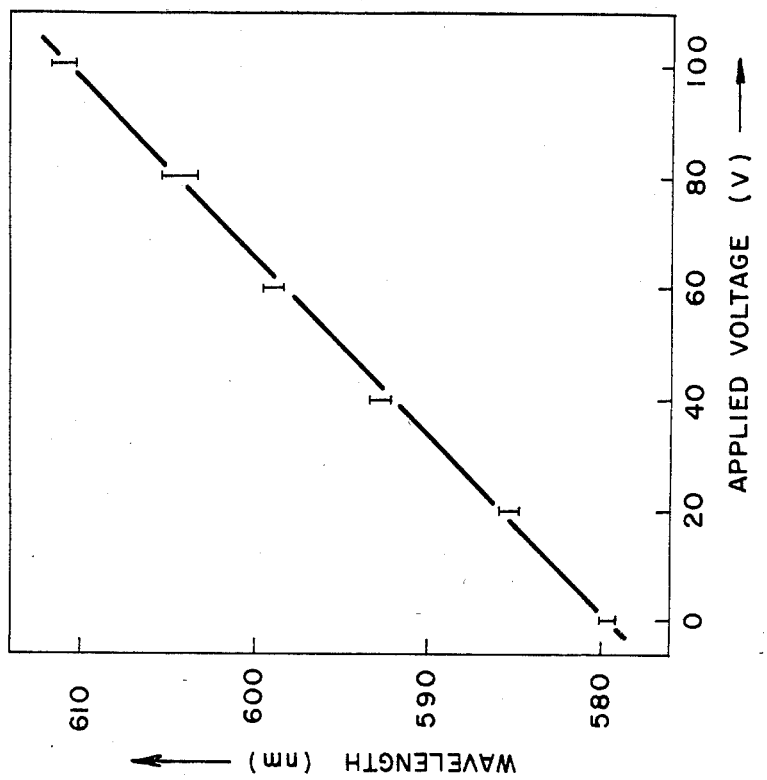
FIG. 6 is a diagram of the wavelength of the laser light produced by the PZT-SCL of FIG. 2 plotted against the voltage applied to the piezoelectric tuning element in the PZT-SCL.

The wavelength of the axial modes were continuously tuned by varying the DC voltage applied to the piezoelectric translator 42. FIG. 6 is a graph of the wavelength of the PZT-SCL output versus the tuning voltage produced by the voltage supply 70.

The PZT-SCL according to the present invention is designed with interchangeable mirror sets so that any known laser dye can also be used when pumped by a suitable subnanosecond laser pulse. For example, this has allowed blue mirrors to be operated in the range of 400 nm to 460 nm, while the blue-green mirrors were operated between 460 and 530 nm.

Experimentation with the PZT-SCL according to the present invention indicates that the laser can be operated at cavity lengths below 5 μm producing single oscillating modes and that these modes can be continuously electrically tuned within the gain bandwidth of a given dye. Accordingly, the PZT-SCL is a useful source of tunable picosecond pulses for spectroscopic experiments.

The unique laser according to the present invention is the first single mode (single frequency or color) short cavity laser. Moreover, the PZT-SCL is the first piezoelectrically tuned short cavity laser. Furthermore, the general design of the PZT-SCL results in a very rugged and reliable laser which may be built in a very small and convenient package on a base plate of generally under 50 square inches.

In the foregoing description of the present invention, a preferred embodiment of the invention has been disclosed. It is to be understood that other mechanical and design variations are within the scope of the present invention. Accordingly, the invention is not limited to the particular arrangement which has been illustrated and described in detail herein.

What is claimed is:

1. An electrically tuned short cavity dye laser comprising:
   a resonant optical cavity including longitudinally translatable input mirror means for receiving laser light and longitudinally translatable output mirror means disposed in closely spaced relation to said input mirror means for transmitting laser light;

an active laser dye pumped by pulses from another laser and disposed in said resonant optical cavity;

piezoelectric translator means having a length responsive to an applied voltage and coupled to one of said mirror means for finely and electrically adjusting the length of said cavity responsively to said voltage by longitudinally translating said mirror means such that the wavelength of axial cavity modes of said laser can be precisely and continuously tuned by varying said applied voltage and said laser can be operated in both single and multiple modes;

mechanical means coupled to the other of said mirror means for coarsely and mechanically adjusting the length of said cavity by longitudinally translating said mirror means; and support means, including a base, for supporting said mirror means for said longitudinal movement.

2. A laser as defined in claim 1, wherein said laser further comprises:

electrical feedback means, coupled to said optical cavity and to said piezoelectric translator means, for varying said applied voltage responsively to changes in the spacing of said mirror means, whereby said feedback means maintains said mirror means at a constant spacing to stabilize the output wavelength of said laser.

3. A laser as defined in claim 1, wherein said pair of mirror means comprises:

a pair of generally flat mirrors, each of said mirrors having an antireflective coating on one side and a dichroic coating on the opposite side, said mirrors being disposed with said dichroic coatings in opposition to form said optical cavity.

4. A laser as defined in claim 3, wherein:

said pair of mirrors comprise an input mirror and an output mirror, and said reflective coating on said input mirror reflects almost all of the emission from said dye means and said dichroic coating on said input mirror transmits most of the wavelength of the pump laser driving said dye laser, and said reflective coating on said output mirror reflects most of the output wavelength of said dye laser.

5. A laser as defined in claim 3, wherein:

said pair of mirrors comprise an input mirror and an output mirror, and said reflective coating on said input mirror reflects greater than about 98% of the emission from said dye means and said dichroic coating on said input mirror transmits greater than about 85% of the wavelength of the pump laser driving said dye laser, and said reflective coating on said output mirror reflects about 90% of the output wavelength of said dye laser.

6. A laser as defined in claim 3, wherein said optical cavity further comprises:

means for sealing said dye means between said pair of mirror means for biasing said pair of mirror means apart; and port means, disposed in said output mirror means and in fluid communication with said optical cavity, for allowing said dye means to be continuously pumped through said optical cavity.

7. A laser as defined in claim 6, wherein:

said sealing and biasing means comprise an O-ring disposed about said optical cavity formed by said pair of mirrors.

8. A laser as defined in claim 1, wherein said mechanical means comprises:

micrometer means disposed adjacent said coupled mirror means; and bearing means, disposed between said micrometer means and said coupled mirror means, whereby mutual adjustment of said micrometer means mechanically translates said coupled mirror means and mechanically varies the length of said optical cavity.

* * * * *